(12) United States Patent
Bryan et al.

(10) Patent No.: US 10,773,933 B2
(45) Date of Patent: Sep. 15, 2020

(54) NUT AND A METHOD OF USE OF THE NUT IN A FASTENER SYSTEM FOR CRANE MATS

(71) Applicant: AXION STRUCTURAL INNOVATIONS LLC, Zanesville, OH (US)

(72) Inventors: Joseph E. Bryan, Glenshaw, PA (US); Frank M. Locotos, Bridgeville, PA (US)

(73) Assignee: Axion Structural Innovations, LLC, Zanesville, OH (US)

( * ) Notice: Subject to any disclaimer, the term of this patent is extended or adjusted under 35 U.S.C. 154(b) by 0 days.

(21) Appl. No.: 16/552,063

(22) Filed: Aug. 27, 2019

(65) Prior Publication Data

US 2019/0382246 A1 Dec. 19, 2019

Related U.S. Application Data

(62) Division of application No. 14/280,019, filed on May 16, 2014, now Pat. No. 10,392,234.

(60) Provisional application No. 61/843,557, filed on Jul. 8, 2013, provisional application No. 61/824,002, filed on May 16, 2013.

(51) Int. Cl.
| | |
|---|---|
| *B66C 23/62* | (2006.01) |
| *B66C 23/78* | (2006.01) |
| *E04B 5/02* | (2006.01) |
| *E04B 5/12* | (2006.01) |
| *F16B 37/14* | (2006.01) |

(52) U.S. Cl.
CPC .............. *B66C 23/62* (2013.01); *B66C 23/78* (2013.01); *E04B 5/026* (2013.01); *E04B 5/12* (2013.01); *F16B 37/145* (2013.01); *Y10T 29/49623* (2015.01)

(58) Field of Classification Search
CPC ......... B66C 23/62; B66C 23/78; E04B 5/026; E04B 5/12; F16B 37/145; E01C 5/14; E01C 9/086
See application file for complete search history.

(56) References Cited

U.S. PATENT DOCUMENTS

| | | | | |
|---|---|---|---|---|
| 280,125 | A * | 6/1883 | Brauchler | F16B 37/145 411/214 |
| 305,328 | A * | 9/1884 | Peck | 404/37 |
| 1,089,380 | A * | 3/1914 | McDonald | E01C 9/083 404/35 |
| 1,881,660 | A * | 10/1932 | Keller, Jr. | E01C 9/06 238/8 |

(Continued)

*Primary Examiner* — Abigail A Risic
(74) *Attorney, Agent, or Firm* — Robert L. Stearns

(57) ABSTRACT

A nut to be used as part of a fastener to be used in multiple ways in various industries or methods has a drive mechanism and stud extending from the drive mechanism with a threaded bore. In addition the nut can be specifically used as a method and as part of special fastener that can be used to join cut, hard-wood members, other naturally occurring manufactured mat members or synthetically man made members, referred to as "timber(s)" or "laminated", in forming a mat used for heavy construction equipment to run on over ground which is not stable. These mats are commonly referred to as "Crane Mats" or "Laminated Mats" in the construction, mining, pipeline, and oil and gas industries among others.

3 Claims, 5 Drawing Sheets

(56) References Cited

U.S. PATENT DOCUMENTS

| | | | | |
|---|---|---|---|---|
| 2,723,607 A * | 11/1955 | Paquin-Kleinermann | | B64F 1/36 |
| | | | | 404/35 |
| 3,272,269 A * | 9/1966 | Murphy | | G01G 19/00 |
| | | | | 177/126 |
| 3,462,114 A * | 8/1969 | O'Dell, Jr. | | F16B 43/005 |
| | | | | 249/195 |
| 4,033,243 A * | 7/1977 | Kirrish | | F16B 37/145 |
| | | | | 411/338 |
| 4,324,037 A * | 4/1982 | Grady, II | | E04B 1/22 |
| | | | | 264/274 |
| 4,376,596 A * | 3/1983 | Green | | E01C 9/086 |
| | | | | 283/3 |
| 4,453,283 A * | 6/1984 | Fitzgerald-Smith | | |
| | | | | E01D 15/133 |
| | | | | 14/2.4 |
| 4,490,083 A * | 12/1984 | Rebish | | F16B 5/02 |
| | | | | 411/338 |
| 4,932,178 A * | 6/1990 | Mozingo | | E01D 2/00 |
| | | | | 52/223.7 |
| 5,244,326 A * | 9/1993 | Henriksen | | F16B 37/145 |
| | | | | 411/180 |
| 5,282,692 A * | 2/1994 | McLeod | | E01C 9/086 |
| | | | | 404/35 |
| 5,809,713 A * | 9/1998 | Ray | | E04H 12/04 |
| | | | | 52/223.7 |
| 6,007,271 A * | 12/1999 | Cole | | E01C 9/08 |
| | | | | 404/19 |
| 6,012,763 A * | 1/2000 | Clemente | | B60J 5/108 |
| | | | | 296/146.11 |
| 6,214,428 B1 * | 4/2001 | Henderson | | B27M 3/0046 |
| | | | | 238/14 |
| 6,418,583 B1 * | 7/2002 | Eyre | | E01D 19/125 |
| | | | | 14/73 |
| 6,575,660 B1 * | 6/2003 | Davis | | E01C 9/086 |
| | | | | 238/14 |
| 7,818,929 B2 * | 10/2010 | Fiutak | | B27M 3/0053 |
| | | | | 52/177 |
| 2003/0031509 A1 * | 2/2003 | Marsik, Jr. | | E01C 9/08 |
| | | | | 404/35 |
| 2007/0056228 A1 * | 3/2007 | Penland, Sr. | | E01O 5/14 |
| | | | | 52/177 |
| 2013/0215381 A1 * | 8/2013 | Raghuprasad | | G02C 5/2281 |
| | | | | 351/178 |
| 2013/0259568 A1 * | 10/2013 | Bouchard | | B26D 3/005 |
| | | | | 404/35 |
| 2014/0082922 A1 * | 3/2014 | Chalverat | | F16B 5/02 |
| | | | | 29/525.02 |
| 2014/0186573 A1 * | 7/2014 | Tubbs | | B32B 7/08 |
| | | | | 428/99 |

* cited by examiner

NUT AND A METHOD OF USE OF THE NUT IN A FASTENER SYSTEM FOR CRANE MATS

CROSS-REFERENCE TO RELATED APPLICATION

This U.S. Divisional Application claims the benefit of U.S. Utility application Ser. No. 14/280,019, filed May 16, 2014, which claims priority to U.S. Provisional Application No. 61/824,002, filed May 16, 2013 and U.S. Provisional Application No. 61/843,557, filed Jul. 8, 2013 all of which are incorporated by reference in their entireties.

BACKGROUND OF THE INVENTION

1. Technical Field

This invention relates to a nut to be used as part of a fastener that can be used in multiple different applications and uses for fasteners. One example of the use is the manufacture of wood Crane Mats used in the construction industry to stabilize a working surface for heavy equipment moving over rather soft or environmentally sensitive ground. This invention relates to the use of steel bolts which hold the crane mats together and how they are assembled. It can be utilized with any size bolt.

2. Related Art

The only known prior art to the nut, is a sleeve nut that is used in the furniture industry. That nut is typically designed for limited torque applications as to not damage the furniture and it is designed so that the bolt cannot pass through the head of the nut and a two bolts cannot engage both the sleeve and head of the nut at the same time. This limits usage. Because of the purpose of the sleeve nut one does not want the bolt pass through and wants to have coverage for the aesthetic appearance of the furniture.

Typically, prior art crane mats have been held together with 1" diameter bolts with a formed round head at one end and a length of thread at the other end with a nut and washer. It has been advantageous to countersink the hole on the nut-washer end for two reasons:
1. To recess the nut and washer end so that they do not stick out from the side of the mat—so that mats can be kept tighter together.
2. So that if a bolt is short of coming all the way through the countersink can allow the nut-washer to reach it inside the recess.

A manufacturer of Crane Mats typically accepts an order for a quantity of mats from its customer, based upon a specified size: Width, Length and Depth (thickness), within specified tolerances. Most critical to the manufacturing process is the overall width of the mat. For instance, a typical width is 4' in overall width, with a depth of 8" (cross sectional view of finished Crane Mat). The 4' width of a wood mat cannot be dimensionally held to exactly 4', because the saw mill can only "hold" one dimension, in this case the depth, 8". In the other cut dimension of the log, the sizes become infinite due to the variations in the diameter of the logs and all parties not wishing to waste that part of the log (cost considerations).

BRIEF SUMMARY OF THE INVENTION

It is an object of this invention to prove a nut that has stud extending from it that has a threaded bore within the stud and a pass through. The pass through allows for the bolt to extend the entire way through the nut or alternatively allows for a second bolt to engage the nut. There is a need in many applications for this type of multipurpose nut.

Our intent in this invention is to eliminate the need for countersinking and create a fastening system with one bolt length using our SPHERICAL NUT SLEEVE. It will correct for any variation in the width of the mat. The elimination of the countersinking would save:
 Bit capital cost
 Regrinding cost
 Inventory costs of bits
 Inventory of nuts and washers
 Inventory and insertion of a washer on each bolt, due to the incorporation of a washer like
  surface on the SPHERICAL NUT SLEEVE
  Labor cost to countersink
  Elimination of trimming of bolt ends that stick out from nuts
 Less overall labor to manufacture mats, increasing production rates Crane Mats are typically made from cut 90° angled timbers 8" or 12" wide on one side, with infinite sizing on the other side. The total width of the Crane Mat is usually 4 feet, but can be made in any total width. The total length of the mats are typically 16 to 20 feet long, but can be made to any infinite length.

Mats will nest closer to each other because the fastener and fastening system allows for completely uniform exposed ends on all manufactured Crane Mats, because the SPHERICAL NUT SLEEVE has a spherical shape head or round flat instead of the regular sharp nut shape.

This system allows for faster assembly of Crane Mats.

The system may save additional labor cost in the process of sizing cut timbers.

Components and Steps to Utilize the Invention

During final stages of Crane Mat assembly, the raw product of sized, cut timbers are assembled in an semi orderly fashion, allowing the final product to comply to a predetermined tolerance finished width. As an example, a manufacturer may set his finished tolerance Crane Mat width to be 47", +/−1".

Our invention comprises one set bolt length and one set SPHERICAL NUT SLEEVE length per given tolerance. In this particular (random) case the bolt length of 46 1/4", a bolt thread length of 3" (minimum) and a SPHERICAL NUT SLEEVE LENGTH of 2.75" overall will be utilized. This will allow all Crane Mats assembled to this tolerance, to utilize one given bolt/SPHERICAL NUT SLEEVE combination, eliminating all need for countersinking the timbers and utilizing a torch or cutting machine to trim the bolt end.

The bolt is inserted into the pre-drilled hole, which is slightly larger than the diameter of the bolt. The bolt can be manufactured with one of several self stabilizing features (such as the deformations on surface of a rebar bolt) on the underside of the bolt head, which allows the bolt to stay stationary (won't rotate) while tightening. Tightening is accomplished by inserting the SPHERICAL NUT SLEEVE into the bolt hole from the other side of the Crane Mat and engaging the threaded end of the bolt. The invention allows for blind engagement of the threads of the bolt partly due to the designed tapered leading edge of the SPHERICAL NUT SLEEVE. The SPHERICAL NUT SLEEVE is engaged by a wrench, usually an air operated wrench utilizing a socket to tighten the bolt—SPHERICAL NUT SLEEVE assembly together, and thus binding the timbers together to manufacture a Crane Mat.

The advantages of the spherical nut sleeve:
- Allows for tighter tolerances between drilled hole and bolt, and Spherical Nut Sleeve, enabling a more compact, stable Crane Mat. The diameter of the nut sleeve is such that it very closely approximates the diameter of the drilled hole in the mat timbers. As an example, the clearance around the Spherical Nut Sleeve between the wall of the hole could be less than 1/32" or less, thus creating a very tight engagement between nut and timber
- Ease of insertion of the bolt into the drilled hole . . . design of the bolt acts as a pilot for the bolt. The bolt can utilize a smaller diameter thread than the diameter of the bolt and can incorporate a chamfered leading thread edge.
- Eliminates completely counter sinking and related capital costs
- Lessens labor in manufacturing
- Faster Assembly
- Greater production
- Can be utilized on any size bolt
- Self centering and engagement of bolt within drilled hole
- Increases safety in the workplace by eliminating the need for torches(ing) acetelyne and oxygen
- Elimination of torching reduces overall manufacturing costs: labor, gases, and equipment As used in this disclosure and claims "crane mat" includes both crane mats and laminated mats.

This invention provides for a nut having a head that includes a drive. Extending from the head is a stud, the stud can have an internally threaded bore. The nut also has a pass-through aligned with a center of the threaded bore. The pass-through having an internal diameter opening capable of receiving a member that threads into the threaded bore. The nut can have an integral flat bearing surface under the head incorporated within the head that acts as a washer. The connection between the head and the stud can be a thicker connection and can be reinforced by having a thicker outer diameter than the stud so that torque can be applied to the head without the torque causing the head to separate from the stud. The head can be rounded.

This invention also provides for a method of producing crane mats without the need for recessed/countersunk holes or cutting off of bolts. A mat structure is provided that has multiple pieces to form the structure and it has a desired length and widths. A bolt is provided that has a length shorter than the desired width of the mat structure. A bore is provided within the mat structure to receive the bolt. The bore runs the entire width of the mat. A nut is also provided having a stud wherein the stud is of a length so that it can thread with the bolt in the bore and secure the pieces together from the crane mat. The bolt head can have many different configurations, flat, spherical, rounded, and square but not limited to those only. The bolt can be made from steel bar, such as rebar, smooth bar, steel tubing, fiberglass or plastic or wood and has a short threaded portion. The bolt can have a chamfer leading edge so that it can be easily inserted into the nut.

Additionally, a method for producing a crane mat without a countersink hole for a nut is provided. Multiple structural pieces that need to be held together to form a mat structure having a desired dimension is provided. A bolt is provided. Within the mat structure is a bore that has substantially the same diameter at each end of the bore. The diameter is large enough for the bolt to fit into a structural piece. This can be one structural piece or multiple structural pieces. A nut is also provided that can thread with the bolt and secure the structural pieces together to form a crane mat. The multiple structural pieces are fastened together to form the mat by inserting the bolt into the bore and fastening the nut and bolt together. The bolt can have a length that is shorter than a desired dimension. The nut can have a stud wherein the stud is of a length so that the stud is within the bore and can thread with the bolt. The bolt can have a flat head. The bolt can also have a surface that assists it through the bore and aligns the bolt with the nut. The bolt also can have a chamfered leading edge so that it can easily inserted into the nut. The nut can have a head with a drive and a stud extending from one side of the head. The stud can have an internally threaded bore. The nut can have a pass-through having an internal diameter opening capable of receive a member that threads into the threaded bore. The threaded bore can have a consistent diameter.

A method for making a crane mat is also provided wherein multiple structural pieces that need to be held together to form a mat structure are provided. The mat structure can have a desired dimension. A bolt is provided. The mat structure has a bore within the mat structure, the diameter of the bore is large enough for the bolt. The diameter may be small enough where it substantially surrounds the bolt or a stud on a nut. The diameter could be just large enough for the bolt to fit into the bore or just large enough for a stud on a nut to fit into it. The bolt can run into one structural piece or multiple structural pieces. The nut can have a head with a drive and a stud extending from one side of the head. The stud can have an internally threaded bore. The nut can have a pass-through having an internal diameter opening capable of receive a member that threads into the threaded bore. The threaded bore can have a consistent diameter.

This invention also provides for a crane mat having multiple structural pieces joined together to form the mat. A bore hole through the multiple structural pieces, the bore hole having two ends. The diameter of the bore hole at each end is substantially the same diameter. The diameter can be just large enough to receive a bolt and a stud from a nut. Alternatively the bore hole could be bigger. A bolt having a head and a threaded portion is inserted in the bore hole ends and a nut threaded onto the bolt that holds the multiple structural pieces together form the crane mat.

This invention also provides for a crane mat having multiple structural pieces joined together to form the mat. A bore hole through the multiple structural pieces, the bore hole having two ends. The diameter of the bore hole at each end is substantially the same diameter. The diameter can be just large enough to receive a bolt and a stud from a nut. Alternatively the bore hole could be bigger. A bolt having a head and a threaded portion is inserted in the bore hole ends and a nut threaded onto the bolt that holds the multiple structural pieces together form the crane mat. The bolt length is shorter than a desired dimension of the crane mat.

DETAILED DESCRIPTION

Figure 1:
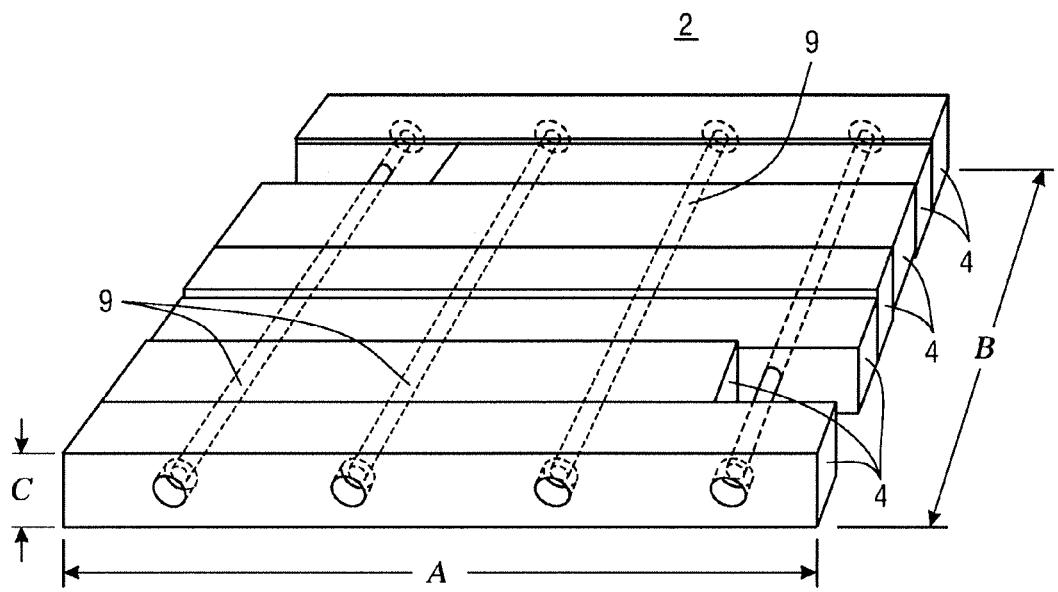
FIG. 1 shows a isometric view of crane mat.
Figure 8:
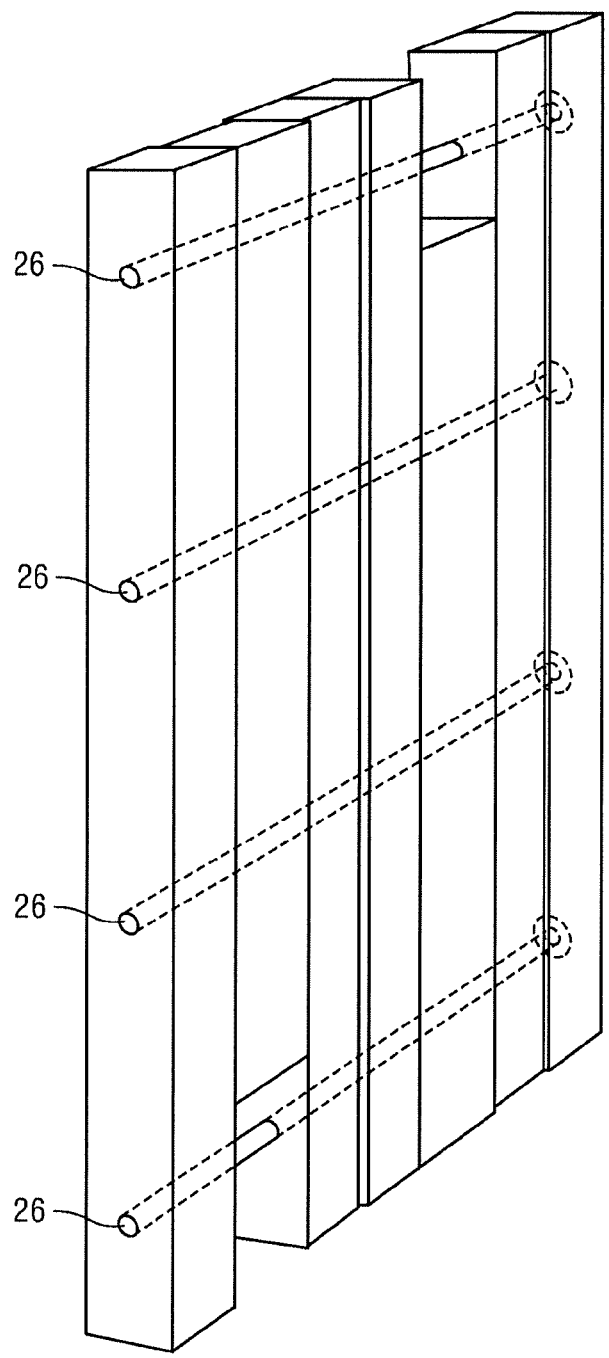
FIG. 8 shows a crane mat.
Figure 9:
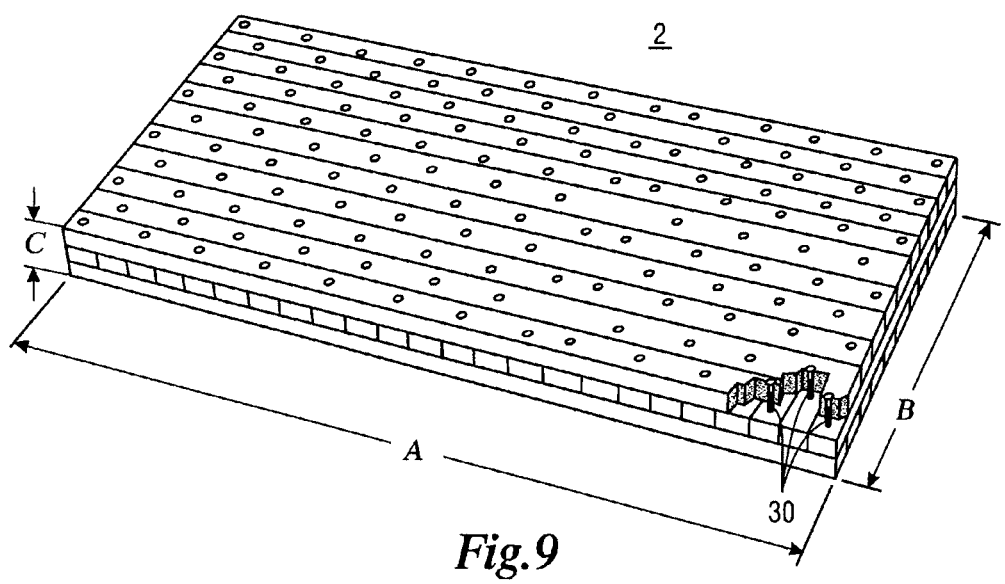
FIG. 9 shows an isometric view of crane mat (laminated mat).

FIG. 1. shows an embodiment of a crane mat 2. The crane mat can have multiple structural pieces 4 that can be made out of various materials. Often the multiple structural pieces 4 are made out of wood. The multiple structural pieces 4 as shown in FIG. 1 can have different widths. The crane mat 2 can have desired dimensions of length A, width B and thickness C. A non-limiting example of the desired dimensions of a crane mat 2 would be a mat that is 4 feet wide, 18-20 feet long and 8 inches thick. The desired dimensions can be any dimensions. For a laminate mat, a typical thickness could be 3-5 inches. With some materials used for constructing the mat, the exact desired dimension cannot be achieved consistently. For example, if wood is used and a typical desired dimension of width b was 4' the width b could ranges from 3'11" to 4'2" because of the inconsistencies in the size of the individual pieces wood. FIG. 1 depicts the multiple structural pieces varying in size or shape so the exact width B of the crane mat 2 may not be obtainable and there could be variation in the width B of the mat itself at different points and there is often variation in width b from mat to mat even if all were desired to be 4 feet in width B. In the prior art in order to accommodate for the varying sizes of the individual multiple structural pieces 4 a bolt that was significantly longer than the width b was used. In addition, because that mats are sometimes placed side by side it was important that the bolt and nut not extend too far from the edge of that mat, otherwise a gap between mats would be created when they were placed side by side. In order to account for the varying sizes of the individual multiple pieces of mats and also not create a gap between two mats, a bolt that extends through the mat is often used with countersink hole for the nut. After the nut and bolt are connected the end of the bolt is often cut off. FIG. 1 shows countersink holes to allow for a regular nut and washer to be recessed into the mat or for the nut as claimed as part of this invention to be used. This is to be contrasted to the crane mat shown in FIG. 8 without having countersunk holes wherein the bore hole ends 26 are the same diameter and not much larger than the bolt or the stud on the nut. A bore within the mat structure 9 is shown and that is where the bolt and or nut run through the mat to connect the multiple structural pieces 4 together. It should be noted that in FIGS. 1 and 8 the bolt runs through the width B. In FIGS. 1 and 8 the bolt can have a length that is shorter than the desired dimension which in FIGS. 1 and 8 is the width B. In contrast with the mats 2 shown FIGS. 1 and 8 is the mat shown in FIG. 9 which is often referred to as a laminate mat. In FIG. 9 the desired dimension is the thickness C. In a mat 2 as shown in FIG. 9 the bolt can have a shorter length that the desired thickness C. If typical crane mat dimensions are 4 feet in width B, 18 feet in length A, and 4 inches thickness C, and those dimensions are used for the desired dimensions of the mats shown in FIGS. 1, 8, and 9 that would mean that a bolt to be used with the mats in FIGS. 1 and 8 could have a length of less than 4 feet. In contrast the bolts used for the mat as shown in FIG. 9 could have a length less than 4 inches. The above is a non-limiting example and the bolts could also be longer than a desired dimension. In the preferred embodiment the bolts for the mat shown in FIGS. 1 and 8 would be less than the width B and would less than the thickness C for the mat shown in FIG. 9.

Figure 1A:
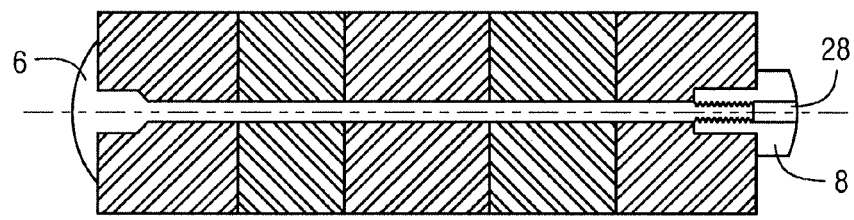
FIG. 1A shows a side cross section view of crane mat with a bolt and nut.
Figure 2:
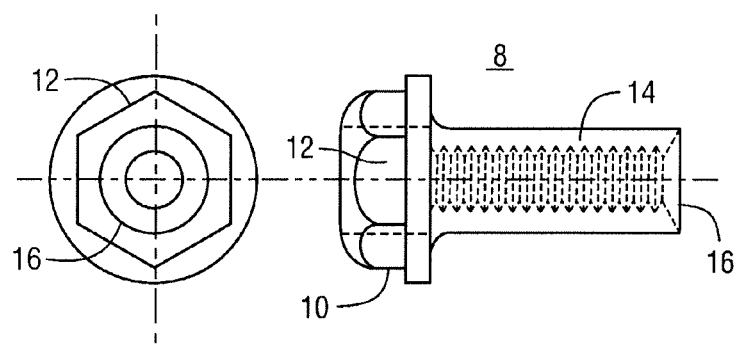
FIG. 2 shows a top and side view of an improved nut Post Nut Sleeve.

FIG. 1A shows the side view of the crane mat 2. The crane mat has a bolt 6 that extends through the mat and the mat is fastened by connection of bolt 6 with nut 8. The nut 8 has a pass-through 28. The bore hold shown in FIG. 1A has substantially the same diameter at both ends and is just larger enough for the bolt head and the nut stud. As shown in FIG. 2 nut 8 has a head 10 with a drive 12. In this preferred embodiment the drive is a six sided surface used with a wrench or socket. A stud 14 extends from one side of the head 10. The stud 14 typically has a threaded bore. This new fastening system 6 and 8 allow for a completely new method for manufacturing crane mates. The reason for this is that the drive for tightening the system is on the nut, plus the sleeve allows for different widths of the individual structural pieces of the crane mat as described above. As indicated above the crane mats may have to stack side by side and therefore may need a flat surface. In order to obtain this, previous methods of manufacturer required that the bolt not extend significantly past the edge of the mat, thus requiring a counter sink hole be used for the nut and washer. Once the bolt and nut were tightened so that the nut was in the countersink hole the bolt portion that could extend past a leading edge of the mat had to be sheared or cut. This countersinking and shearing procedures created significant labor and safety issues.

Figure 3:
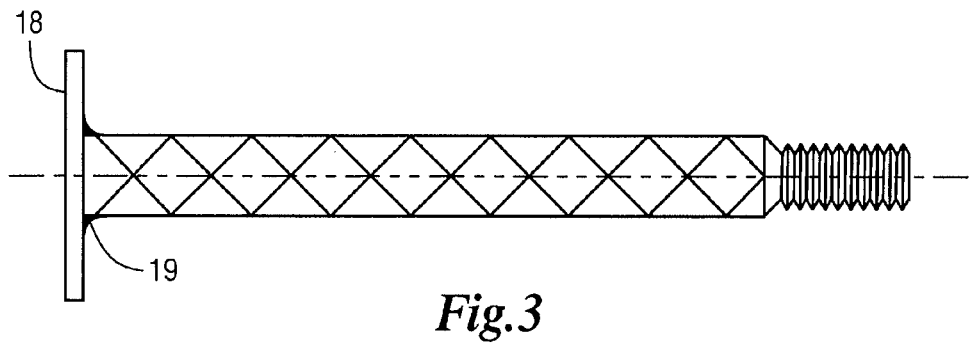
FIG. 3 shows a bolt for a crane mat system for use with the Post Nut Sleeve.

FIG. 3 shows a new bolt 6. This bolt can be made from rebar. As seen the bolt 6 has a flat bolt head 18. As shown in FIG. 3 the bolt 6 has a surface that assists it through the bore and aligns the bolt with the nut. When the hole is drilled often inside the hole if the material is wood, the wood splinters inside the bore. If the nut and bolt have to thread inside the bore, the splintering can cause the bolt to be off center. Having a deformed surface can help keep the bolt through the bore and align the bolt. The bolt 6 could be made from rebar, steel tubing, fiberglass, plastic or wood. The bolt in FIG. 3 shows the head 18 is welded 19 onto the rebar bolt. The head of 18 could also be forged as shown in FIG. 5.

Figure 4:
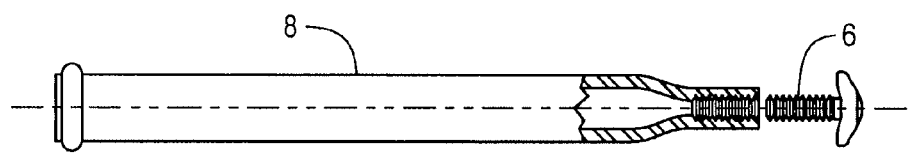
FIG. 4 shows a elongated nut with a bolt.

FIG. 4 shows an alternate embodiment of the nut 8 and the bolt 6. The bolt 6 is constructed from steel tubing. There is a flat head that is welded to the tubar and reduced threaded length on the opposite end of the bolt 6. The threaded end can have a chamfered section in order to make connection with the nut 8 easier.

Figure 5:
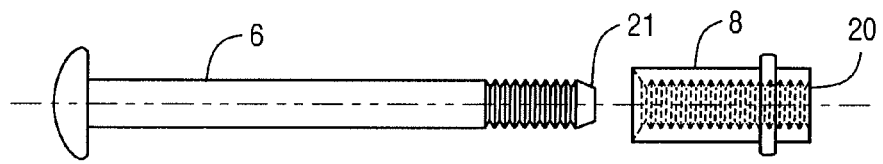
FIG. 5 shows Spherical Nut Sleever) and bolt.

FIG. 5 shows an embodiment of the nut 8 and bolt 6. Threaded bore 20 can be seen. Threaded bore 20 will allow for another bolt to be connected to nut 8.

Figure 6:
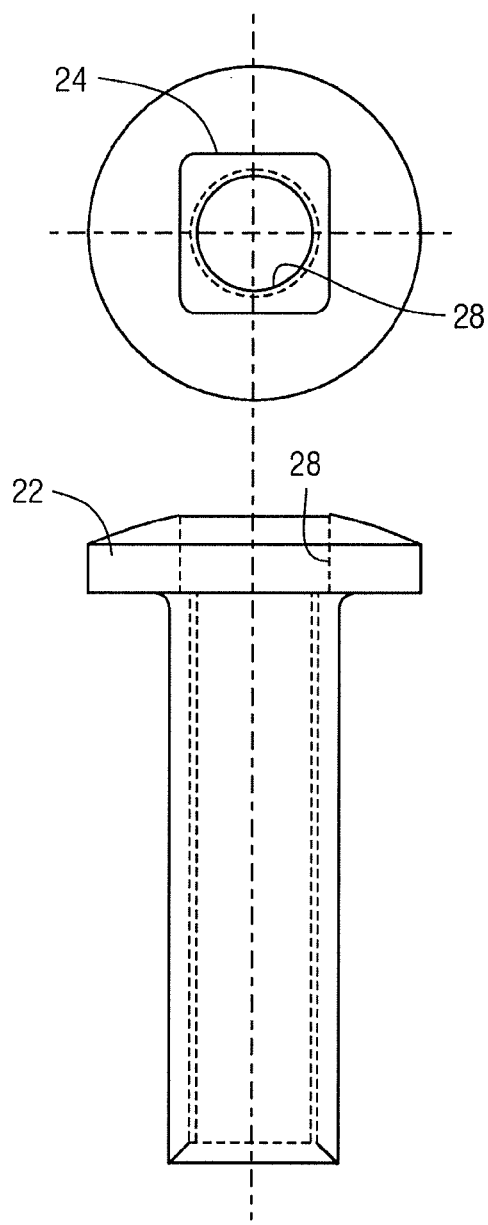
FIG. 6 shows a top and side view of an alternate embodiment of nut.

FIG. 6 shows an alternate embodiment of the nut 22. Nut 22 has an inner drive mechanism 24.

Figure 7:
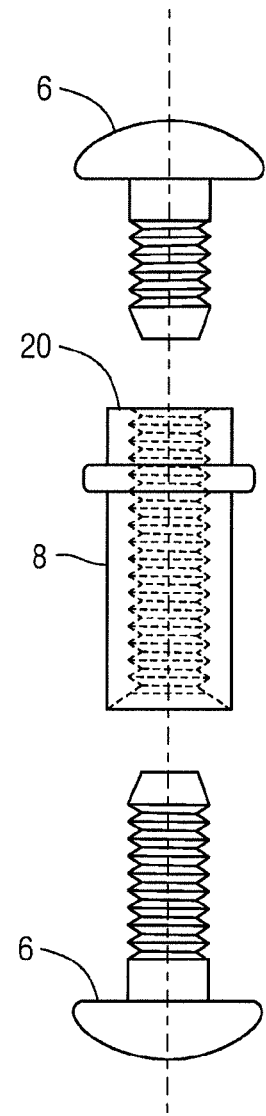
FIG. 7 shows a top and side view of the nut.

FIG. 7 shows nut 8 and two bolts 6. As can be seen nut 8 has a pass-through 20 that would either allow a bolt 6 if long enough to pass completely through nut 8 or alternatively allow for a second bolt 6 to enter into the opposite side of nut 8. This is a completely new and novel feature of nut 8. No other nut has the combination of the stud, pass-through and drive. This will allow for the nut 8 to be used in numerous different applications for which either pass-through of the first bolt 6 is required or a second bolt 6 is required. This is completely contrary to the previous thinking with these type of nuts because that intentionally don't provide for pass-through.

FIG. 9 shows a crane mat (laminated mat) 2. Fasteners 30 are used in the desired dimension of thickness C. The multiple structural pieces in this embodiment are both stacked and beside each other. Multiple fasteners are used. Those fasteners are nuts and bolts as shown and described in this application.

A person of skill in art would use standard bolt and nut making techniques to make the nut and bolt shown.

Various changes could be made in the above construction and method without departing from the scope of the invention as defined in the claims below. It is intended that all matter contained in the above and as shown in the accompanying drawings, shall be interpreted as illustrative example and not as a limitations.

Obviously, many modifications and variations of the present invention are possible in light of the above teachings. It is, therefore, to be understood that the invention may be practiced otherwise than as specifically described while still being within the scope of the invention.

What is claimed is:

1. A crane mat comprising:
    (a) multiple structural pieces to be joined together in order to form the mat having desired dimensions;
    (b) a bore hole through the multiple structural pieces, the bore hole having two ends;
    (c) a bolt having a head and a threaded portion, the thread portion inserted into one of the bore hole ends, the bolt length is shorter than a desired dimension;
    (d) a nut threaded onto the bolt that holds the multiple structural pieces together to form the crane mat, wherein the nut has an enlarged head with external wrench flats and a tubular stud extending from the head, the nut including a central passage extending through both the stud and the head of the nut and sized to accommodate the threaded portion of the bolt, at least the stud portion of the nut is threaded for mating with the threaded portion of the bolt, the stud being fully inserted into the other end of the bore hole opposite the bolt and threaded into connection with the bolt, the head of the nut remaining fully outside the bore hole and engaging an outside surface of the structural pieces to cooperate with the bolt in tightly clamping the structural pieces together; the mat including at least one additional bore hole and an associated bolt and nut of the same construction and mounted in the same way for clamping the structural pieces at at least two locations.

2. The crane mat according to claim 1, wherein the passage of the nut is threaded along its full length.

3. The crane mat of claim 1 wherein the multiple structural pieces consist at least in part of a plurality of synthetic man-made beams.

* * * * *